United States Patent [19]

DeArras

[11] Patent Number: 4,571,702

[45] Date of Patent: Feb. 18, 1986

[54] POWERLESS REMOTE PROGRAM RESERVOIR

[75] Inventor: James M. DeArras, Richmond, Va.

[73] Assignee: Hand-Held Products, Inc., Charlotte, N.C.

[21] Appl. No.: 406,480

[22] Filed: Aug. 9, 1982

[51] Int. Cl.[4] ............................................ G06F 13/00
[52] U.S. Cl. .............................. 364/900; 307/296 R; 364/707; 365/226
[58] Field of Search ............... 364/707, 709, 200, 710, 364/900; 307/296 A, 296 R; 365/226, 227, 229, 94

[56] References Cited

U.S. PATENT DOCUMENTS

| | | | |
|---|---|---|---|
| 4,139,893 | 2/1979 | Poland | 364/200 X |
| 4,151,611 | 4/1979 | Sugawara et al. | 364/900 X |
| 4,171,539 | 10/1979 | Tawfik et al. | 364/900 |
| 4,317,180 | 2/1982 | Lies | 364/900 X |
| 4,381,552 | 4/1983 | Nocilini et al. | 364/707 X |
| 4,398,248 | 8/1983 | Hsia et al. | 364/200 |
| 4,445,205 | 4/1984 | Ebel | 365/227 |

FOREIGN PATENT DOCUMENTS

| | | |
|---|---|---|
| 54-44447 | 4/1979 | Japan . |
| 54-123839 | 9/1979 | Japan . |

OTHER PUBLICATIONS

"Power Switch ROMs and PROMs Quickly", Electronic Design 9, vol. 25, pp. 102–104, Apr. 26, 1977.

Primary Examiner—James D. Thomas
Assistant Examiner—David L. Clark
Attorney, Agent, or Firm—Dority & Manning

[57] ABSTRACT

An apparatus for making available to a calculator remote programs provided on memory chips and transferring the data stored in the chips into the calculator using only the power supply of the calculator. A connector extends between the calculator and the apparatus for supplying a chain of clock pulses from the calculator for controlling the transfer of data between the apparatus and the calculator. The EPROM chips are temporarily turned on with power generated by the power supply carried in the calculator transferring the data stored in the chip to a temporary storage device. Data is transferred from the temporary storage device to the calculator at a slower rate than the rate that the data is transferred into the temporary storage device from the chip. Power is cut off to the chip immediately after the data is transferred from the chip to the temporary storage device minimizing the power requirement for transferring data from the chip to the calculator. A pair of semi-conductive devices and a capacitor are used for temporarily turning on the chip with the power.

7 Claims, 6 Drawing Figures

POWERLESS REMOTE PROGRAM RESERVOIR

BACKGROUND OF THE INVENTION

Heretofore, when using hand held calculators such as a Hewlett-Packard HP-41C, in order to have a particular program designed for the calculator, it required a substantial period of time and costs in that the information had to be forwarded to the company which normally made ROM chips that were adapted to be plugged into sockets carried on the top portion of the calculator.

While the chip and particular programs did work satisfactorily in the hand held calculator, they did not provide the versatility normally available in EPROM chips.

One disadvantage of utilizing EPROM chips in remote boxes is that there is a substantial amount of power drain while the chip is turned on for transferring the data consisting of the program from a remote source to the calculator.

The use of external batteries is not practical due to the difficulty of constructing a circuit so that the power source for the remote apparatus and the calculator are compatible, and the circuit be designed so that if there is a power failure in the remote source, it does not destroy the programs and information stored within the calculator.

It has been known to selectively remove power from components forming part of digital computer systems when processing is completed in order to minimize power requirements. One such device is disclosed in U.S. Pat. No. 4,171,539.

Another power supply control system for memory devices is disclosed in U.S. Pat. No. 4,141,611.

In U.S. Pat. No. 4,208,724, there is disclosed a system and method for clocking data between a remote unit and a local unit. Other U.S. Pat. Nos. that were developed during a search and may be of interest are as follows:

| 4,125,869; | 4,145,741; | 4,164,786; | 3,726,569; |
| 4,009,379; | 4,080,659; | 4,317,180; | 4,151,611. |

SUMMARY OF THE INVENTION

The apparatus constructed in accordance with the present invention provides a versatile and unlimited library for programmable calculators such as the Hewlett-Packard HP-41C calculator. In one particular apparatus, EPROM chips are programmed and turned on for a predetermined period of time so that the program stored therein can be read out during a short period of time minimizing the power drain on the internal battery of the calculator. As soon as the data is read out of the EPROM, it is turned off. When reading the information of the program out of the EPROM, it is first fed in parallel form to a shift register where it is temporarily stored prior to being transferred to the calculator in serial form.

It is important to have the capability of producing a program on a chip in a short period of time so as to readily make the programs available to users where the programs are subject to frequent changes. EPROMS can be programmed by first setting up the program in the calculator and then transferring the program to a host computer. The host computer, in turn, burns the program into the EPROM chip.

Once the program has been loaded into one or more EPROMS, then the EPROMS can be readily plugged into sockets provided in a housing hereinafter referred to as the "black box" which is comparable in size to the hand held calculator.

When it is desired to transfer the program from the EPROM carried in the black box, it is only necessary to supply the correct address and command code on the calculator to cause the transfer. The transfer is performed with a minimum of power requirement. A connector extends between the calculator and the black box so that various signals produced by the calculator such as clock pulses, sync signals, information and address signals can be readily transferred to the black box. The apparatus also includes a comparator for making a comparison between the address submitted by the calculator with the address of the EPROM carried in the black box. When there is a match of address, then the data stored in the EPROM is transferred out of the EPROM in parallel form to a shift register. The transfer of the data from the EPROM memory chip takes place in a window which has a width of less than the time between two consecutive pulses being generated by the calculator. After the data has been transferred from the EPROM into the storage register, the EPROM chip is turned off and the subsequent clocking pulses generated by the calculator cause the information to be transferred from the temporary storage register in serial form to the calculator.

Accordingly, it is an important object of the present invention to provide an apparatus including a supplemental program for calculators that is batteryless or powerless and only requires a minimum amount of power from the calculator when transferring data provided therein to the calculator.

Another important object of the present invention is to provide a program library in EPROM storage format for an HP-41C calculator.

Still another important object of the present invention is to provide inexpensive EPROM memory programs for HP-41C calculators.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Figure 1:
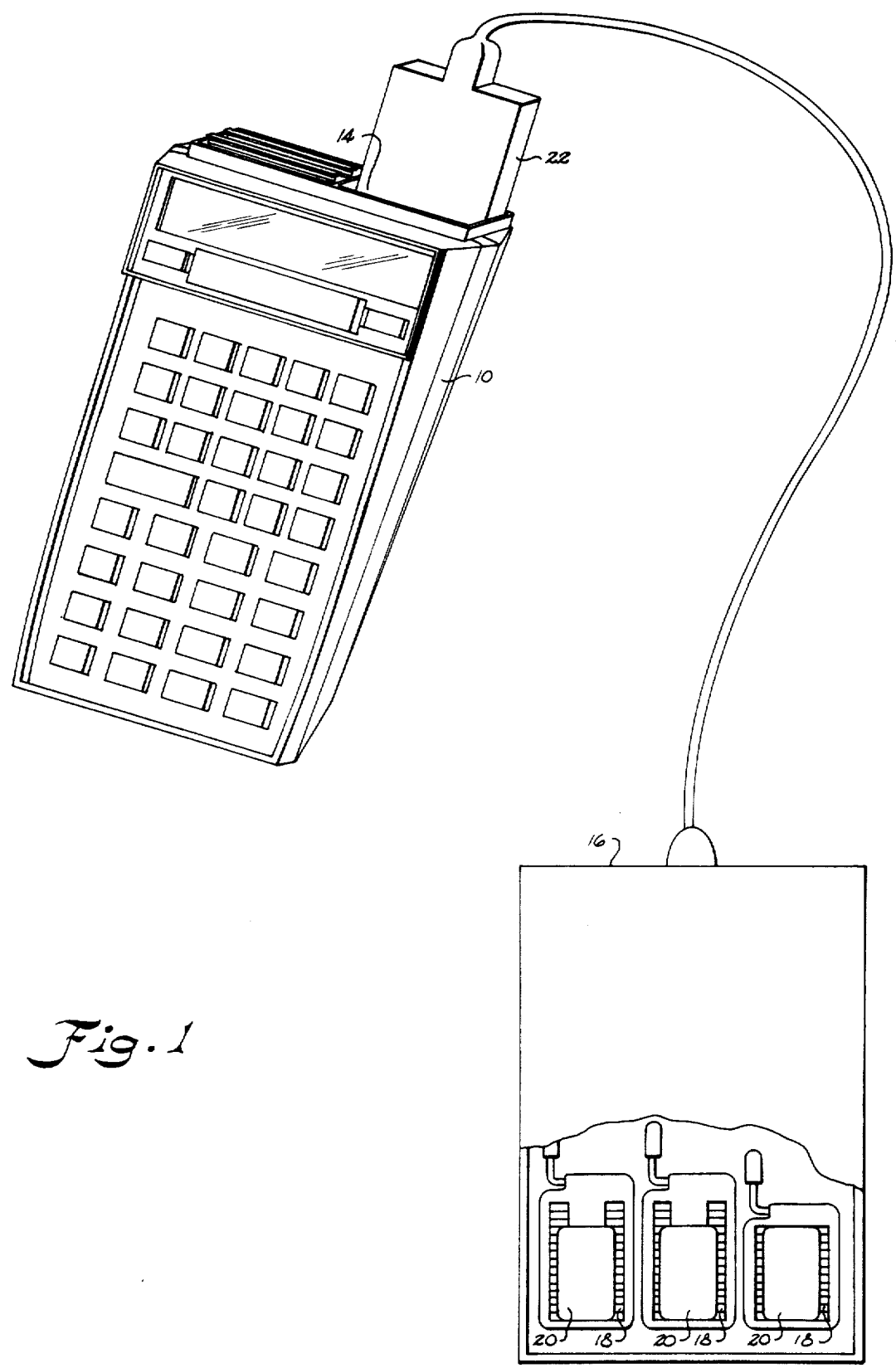
FIG. 1 illustrates a conventional Hewlett-Packard 41C calculator with a remote program apparatus constructed in accordance with the present invention.

Referring to FIG. 1 of the drawings, there is illustrated a conventional Hewlett-Packard 41C calculator 10 which has the conventional keyboard 12 provided thereon for use with various programs stored therein. Memory chips in the form of ROMS are adapted to be plugged into one of four sockets or ports 14 provided on the upper end of the calculator.

In order, however, to make the calculator more flexible and to be able to utilize EPROM memory chips, an apparatus is constructed which includes a black box 16 that has a plurality of sockets 18 provided therein into which EPROM memory chips 20 can be plugged in. The black box, in turn, has a male connector 22 that is adapted to be plugged into the conventional socket 14 provided on the calculator to produce communications between the black box and the calculator.

As previously mentioned, the calculator is a conventional calculator produced by Hewlett-Packard and identified as HP-41C calculator. It's operation is discussed in great detail in the owner's handbook and programming guide published by Hewlett-Packard Company.

Figure 2:
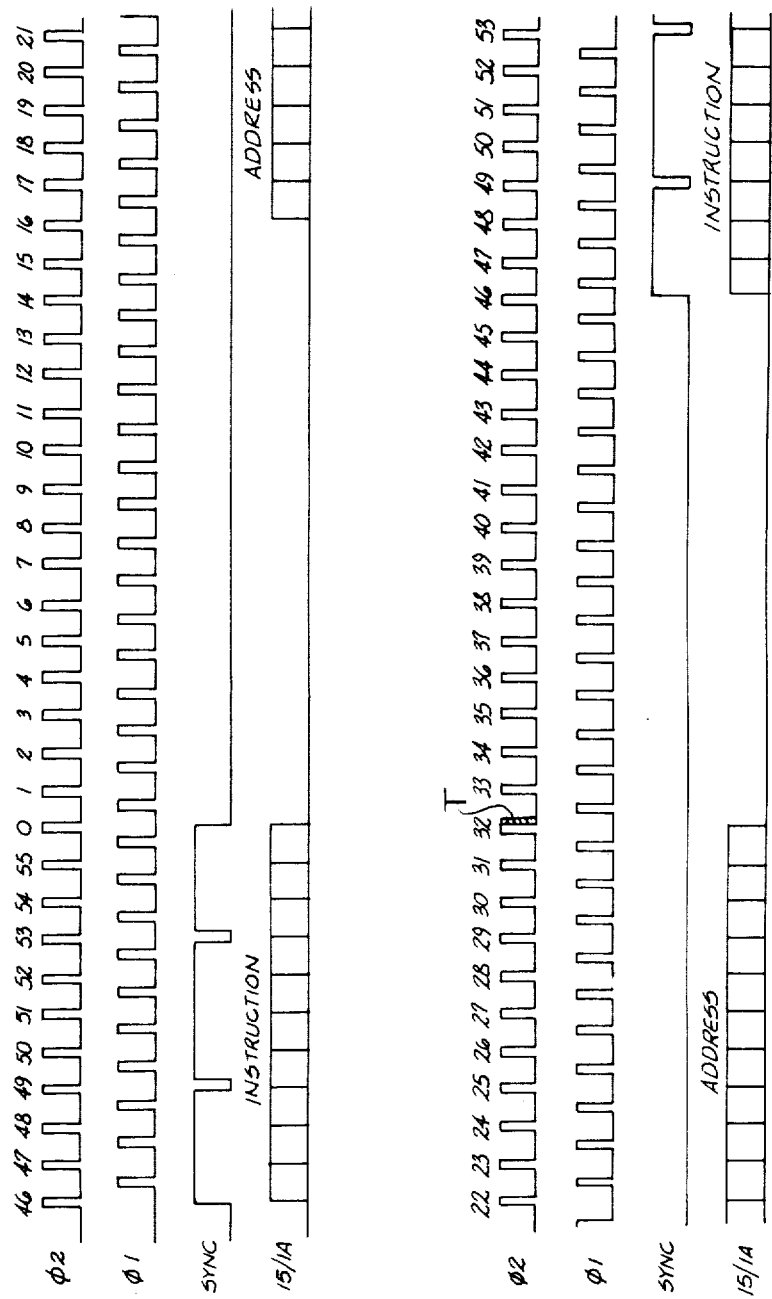
FIG. 2 is a timing chart showing the pulses utilized with the apparatus.

Available at the contacts provided in the sockets, are the pulse chains shown in FIG. 2 of the drawings. The calculator produces a pair of clock pulses identified as $\phi 1$ and $\phi 2$ having a clock time of approximately 330 khz. It takes fifty-six of the clock pulses for a complete instruction cycle from the calculator. Slightly more than one instruction cycle is shown in FIG. 2 for the purpose of explaining the operation. Because of the power requirements of the EPROM chips, if the EPROM chips remain on for the entire fifty-six pulse cycle, it would drain the power supply provided in the calculator prematurely. Accordingly, the apparatus constructed in accordance with the present invention permits the EPROMS to be turned on during a tranfer (T) window extending from the trailing edge of the thirty-second pulse of $\phi 2$ till the leading edge of the next $\phi 1$ pulse. As a result, all of the information and data stored in the EPROM is transferred to a temporary storage register during this short period of time. Also shown in FIG. 2 is the sync signal produced by the calculator in line 3 and information and address signal shown in line 4. The particular period of time that the various pulses and signals are produced are in reference to the fifty-six clock pulses which make up a complete instruction cycle.

Figure 3:
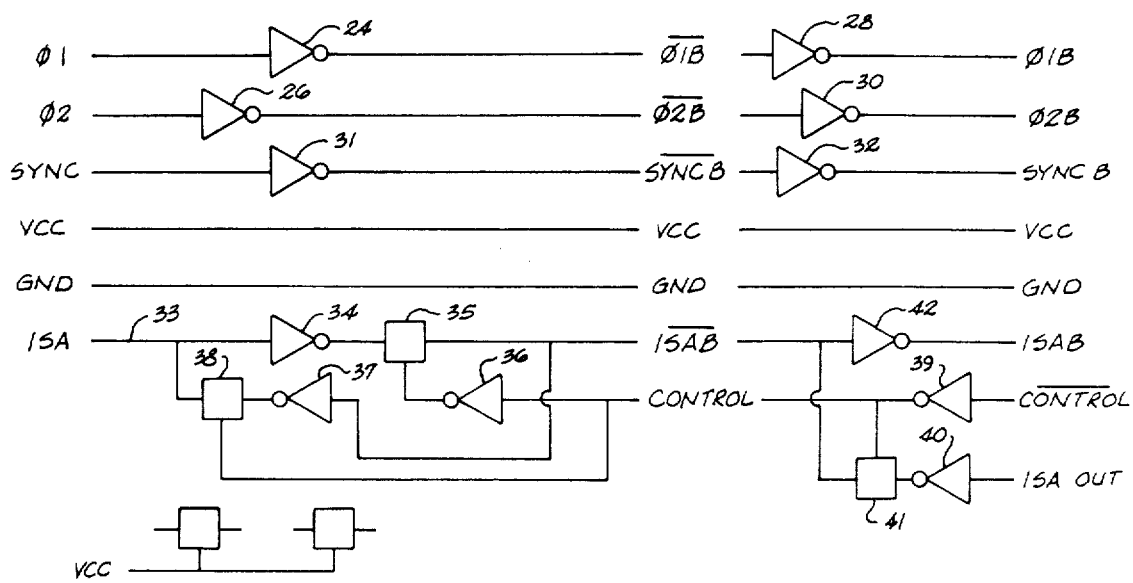
FIG. 3 is a schematic drawing showing the connection of the plug and the cable interface between the black box and the 41C calculator.

Referring to FIG. 3 of the drawing, there is illustrated the interface cable and plug between the black box 16 and the calculator. The signals shown on the left represent the signals available at the socket 14 of the calculator 10 and include the $\phi 1$ signal, $\phi 2$ signal, sync, the regulated power VCC from the power supply provided in the calculator 10, ground GND, and information and address signal ISA. The $\phi 1$ and $\phi 2$ signals are inverted and buffered by inverters 24 and 26, respectively. After they are inverted by the inverters 24 and 26, they are again inverted by inverters 28 and 30 producing $\phi 1$ and $\phi 2$ signals buffered that are fed into the black box.

The sync signal is also buffered and inverted by inverters 31 and 32.

In order to control the direction of flow of the information and address signal between the calculator 10 and the black box 16 over line 33, an inverter 34 and an analog switch 35 are interposed in line 33. A controlled signal is applied through an inverter buffer 36 to the analog switch for enabling the signal to pass therethrough. When it is desired to have the flow of information and address to pass in the opposite direction through line 33, then inverter buffer 37 and analog switch 38 are utilized under control of a control signal coming from the circuit discussed in more detail below. It is noted that in the cable interface, there is also an inverter buffer 39 in the line which receives the CONTROL signal. Similar ISA-OUT signal is applied through inverter 40 and an analog switch 41. In the cable interface lead still another inverter 42 is provided for buffering and inverting the information and analog address signal.

Figure 4:
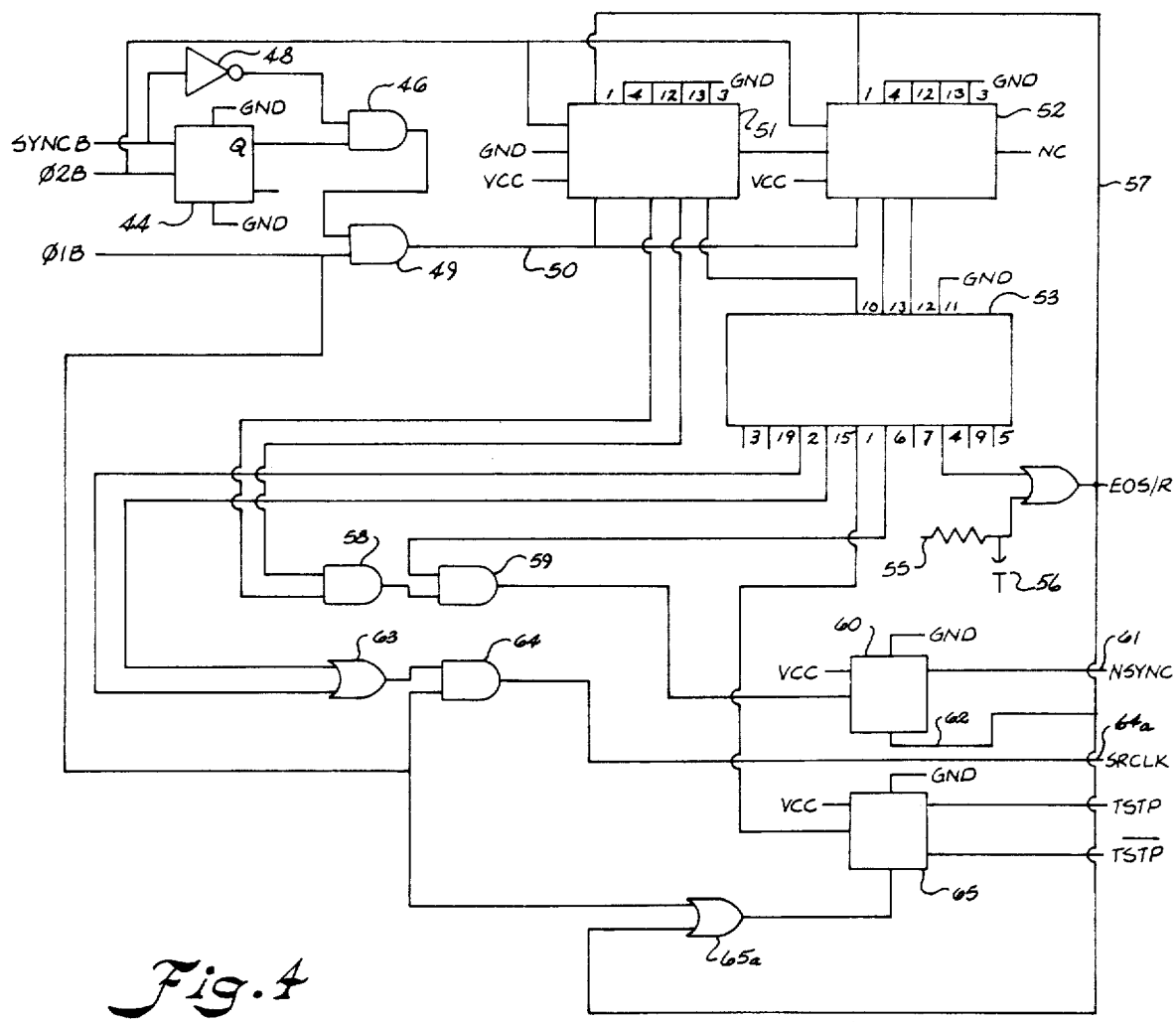
FIG. 4 is a circuit schematic showing the timing and control circuit portion of the apparatus constructed in accordance with the present invention.

In FIG. 4, the buffered SYNC signal and the buffered $\phi 1$ and $\phi 2$ signals are utilized for generating five separate signals labeled EOS/R which means end of sync and reset; NSYNC which is a new sync signal, SRCLK which is a shift register clock signal, TSTP which is a test period signal, and TSTP.

These signals are produced by feeding the SYNCB signal and $\phi 2$ B signal to a flip-flop 44. Connected to the Q output of the flip-flop 44 is one input of AND gate 46. The other input of the AND gate 46 is connected to the SYNC pulse through an inverter 48. The output of the AND gate 46 is fed to one input of another AND gate 49. The other input of AND gate 49 receives the $\phi 1$ B signal and when both are present, a reset signal is produced on output line 50 and fed to the counters 51 and 52. The chain of $\phi 2B$ signals are fed into the shift registers 51 and 52 and operate as a clock pulse for the registers. The counters 51 and 52 are automatically reset after they count up to 56.

The output signals from the counters 51 and 52 are fed into a decoder 53 which produces an end of sync and reset pulse EOS/R at the output of OR gate 54 after 56 pulses are received. An RC circuit including including resistor 55 and capacitor 56 is connected to the input of the OR gate 54 for producing a reset signal on the output of OR gate 54 upon power up of the apparatus. It is noted that the reset signal is fed back to the counters 51 and 52 over lead 57. This ensures that the apparatus starts up in the right state when power is turned on.

In order to generate a new sync signal, two AND gates 58 and 59, along with a flip-flop 60, are utilized. The AND gate 58 has one input connected to pin 14 of counter 51 and the other input connected to pin 11 of counter 51. One input of AND gate 59 is, in turn, connected to pin 6 of the decoder 53 and the other input is connected to the output of AND gate 58. The output of AND gate 59 is, in turn, connected to the input of flip-flop 60. As a result of the connections of the AND gates 58 and 59, when state 46 as represented by the $\phi 1$ cycle shown in FIG. 2 arrives, a signal is produced from the output terminal of AND gate 59 for triggering the flip-flop 60 causing a new sync signal to produce on output lead 61. It is also noted that the reset terminal 62 of the flip-flop 60 is connected to receive the EOS/R signal produced earlier by the OR gate 54.

It is desired to produce a new sync signal such as NSYNC since in the normal operation of the calculator, the sync signal is often missing and the internal circuit of the apparatus requires that there be a sync signal present at all times.

In order to to produce a shift register clock pulse on lead 64a for shifting in the address between stages 16 and 31 as shown on the timing cycle of FIG. 2, OR gates 63 and 64 are utilized. The inputs of OR gate 63 are connected to pins 2 and 15 of the decoder 53. The output of the OR gate 63 is connected to one input of the AND gate 64. The other input of the AND gate 64 receives the $\phi$1B signal. Such, a cominbation of logic, causes the shift clock pulse to be produced.

In order to produce a TSTP pulse which occurs after the thirty second pulse of the $\phi$2 timing circuit and a $\overline{\text{TSTP}}$ signal, a logic circuit including OR gate 65a and flip-flop 65 is utilized. One input of the OR gate 65a is connected to the $\phi$1B chain of pulses and the other input of the OR gate 65a is connected to receive the end of sync and reset signal EOS/R. One input of the flip-flop is connected to pin 4 of the decoder 53. As can be seen, at the right side of FIG. 4, the timing and control circuit produces five separate signals EOS/R, NSYNC, FSRCLK, TSTP, and $\overline{\text{TSTP}}$.

Figure 5:
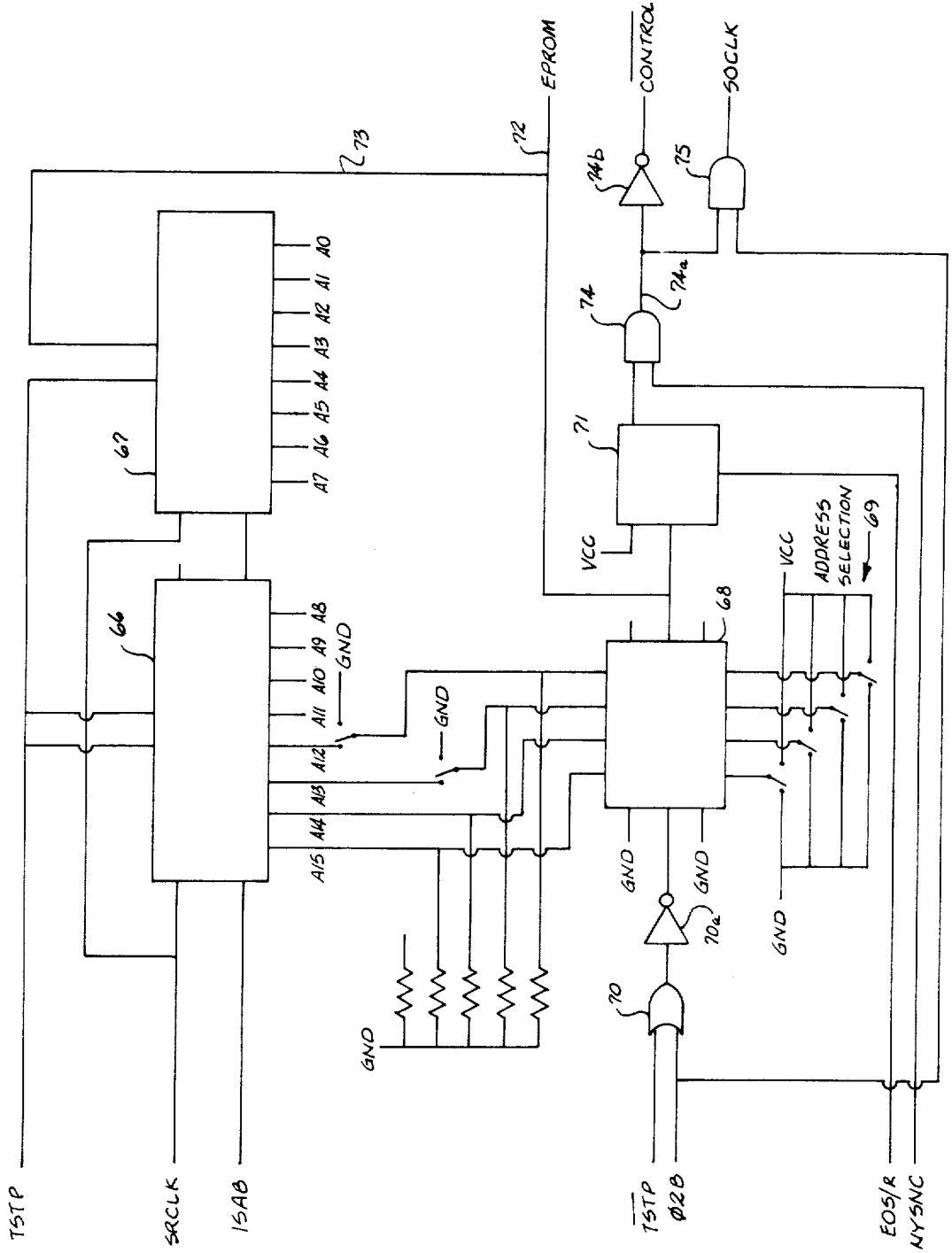
FIG. 5 is a circuit schematic illustrating an address decode and selection portion of the circuit constructed in accordance with the present invention.

Referring now to FIG. 5, the signals produced by the timing control circuit of FIG. 4, along with the instruction and address signal ISAB are fed into the address decode and selection circuit of FIG. 5. There are two shift registers 66 and 67 which receive the address being transmitted from the calculator. Each one of the shift registers handle eight bits of the sixteen bit address which is fed therein over pin 2 When the first shift register 66 is full, it shifts through to the second shift register 67. The SRCLK which was produced by the timing control circuit of FIG. 4 is used for clocking in the address into the shift register 66 and 67. After the address has been clocked into the shift register 66 and 67, the test pulse TSTP basically turns on the outputs of the shift registers 66 and 67. Up until that time the outputs were floating. The reason for this is that the outputs are connected to the EPROMS and the EPROMS would excessively load them if they were connected at all times.

During the test period, the outputs of the first shift register 66 are turned on for comparing the address with the address previously stored in the comparator 68. If the bit pattern coming into the comparator 68 on the pins 11, 9, 1 and 14 match the setting of the switch provided on the opposite side of the comparator which is the address selection switch generally designated by the reference character 69, then it will allow the TSTP signal which is ORed by the $\phi$2B signal in OR gate 70 and inverter in invertor 70a to pass therethrough to an input of flip-flop 71. The signal or the compared signal coming out of the comparator 68 also becomes the EPROM signal appearing on output 72. This EPROM signal is what is used for turning on the EPROM chip which is discussed later. The same signal coming out of comparator 68 is fed through lead 73 to turn on the other section of the shift register 67 so that the entire address is now appearing on the output leads A-0 through A-15 of the shift registers 66 and 67. This entire address is presented to the EPROM chip as will be discussed later.

At the same time that we had a comparison by the comparator 68, such information is stored in the flip-flop 71 so that a memory is produced indicating that the data has to be shifted out of the EPROM.

When state 46 comes around, NSYNC will be true and since we have a true coming in from flip-flop 71, AND-gate 74 will produce an output signal on its output terminal 74a. This output signal is inverted by inverter 74 to produce a control signal. The output of the AND gate 74b is also fed to another AND-gate 75 which has the $\phi$2B signal applied to its other input. This produces a shift register output clock signal (SOCLK) which clocks between cycles 46-55 for the purpose of shifting the data that was previously latched.

Figure 6:
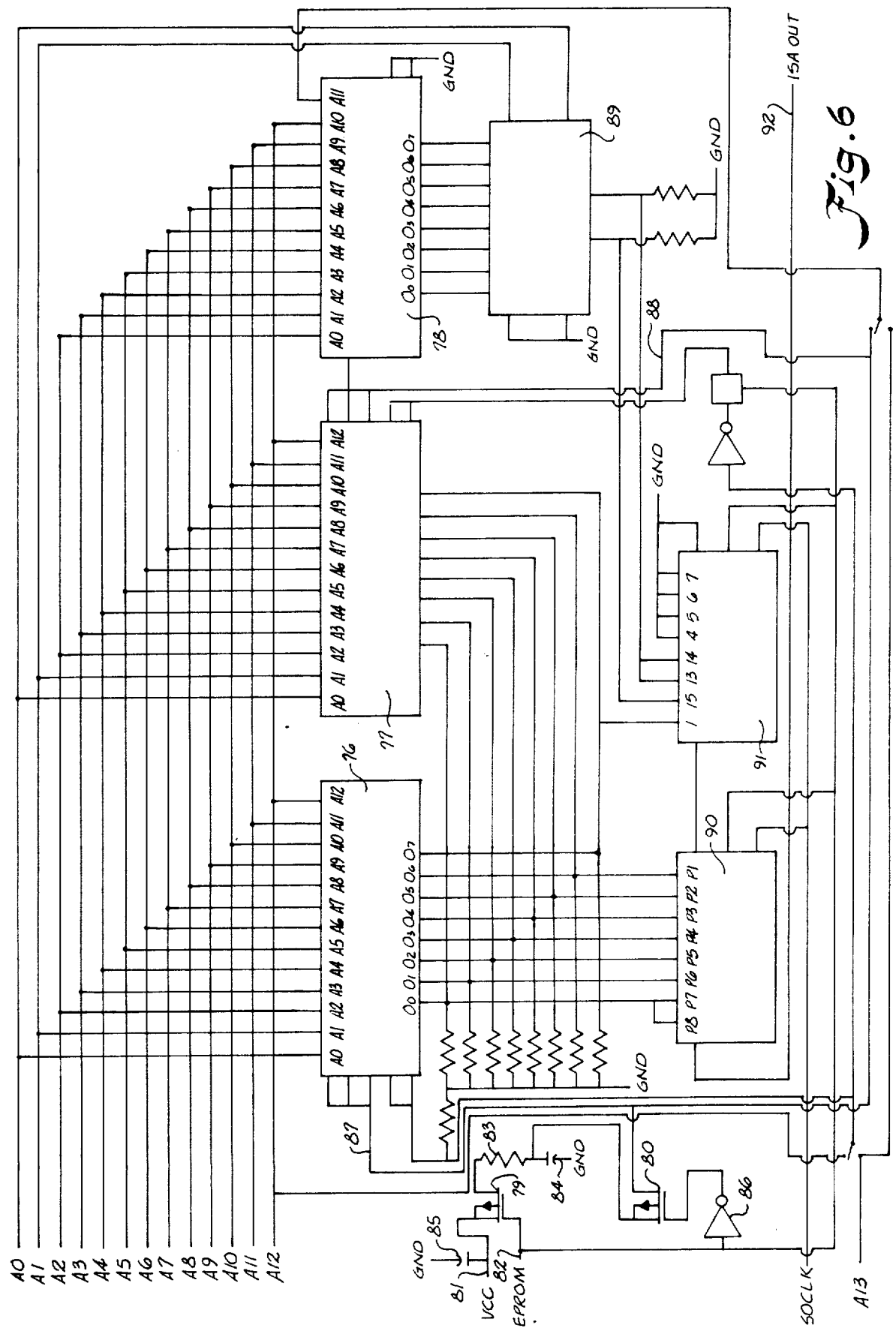
FIG. 6 is a circuit schematic illustrating an EPROM control and output circuit forming part of the apparatus constructed in accordance with the present invention.

In FIG. 6, there is illustrated the EPROM control and output circuit which consists of the EPROMS 76, 77 and 78 plugged into sockets carried in the black box as shown in FIG. 1. Different reference characters were applied to the EPROM in the detailed circuit of FIG. 6 than for the EPROMS shown in FIG. 1.

Two field effect transistors 79 and 80 are provided for controlling the power for turning on the EPROMS 76, 77 and 78. The lead 81 labeled VCC is connected directly to the power supply in the calculator. However, in order to conserve energy and power, it is desired that the EPROMS only be turned on for a short period of time. When looking at the timing chart of FIG. 2, this window occurs between the thirty-second and thirty-third pulse of $\phi$2.

The EPROM signal that was produced in the address decode and selection circuit of FIG. 5 is applied to lead 82 which, in turn, is connected to the trigger electrode of the transistor 79. When the transistor 79 is triggered on prior to receiving the EPROM signal the VCC voltage passes through the transistor, resistor 83 to charge capacitor 84. Another capacitor 85 is connected to line 81 for smoothing the VCC signal. Whenever it is desired to receive the data stored in the EPROMS 76, 77, and 78, the EPROM signal appearing on lead 82 turns the semiconductor 79 off. However, the capacitor 84 has already been charged. The same EPROM signal appearing on lead 82 is fed through an inverter 86 to a trigger electrode of the field effect transistor 80 turning this transistor 80 on. When transistor 80 is turned on, the capacitor 84 is allowed to discharge through transistor 80 to apply a voltage on leads 87 and 88 to the EPROMS 76, 77 and 78. In addition to the EPROMS being powered up, the storage registers 89 will also be powered up. As can be seen, EPROMS are turned on by the charge appearing on the capacitor 84 and if the voltage supply would fail, such would not adversely affect the transfer of data since such is under control of the capacitor 84. If something were to fail at this stage of the operation, the calculator would not be loaded down since the capacitor 84 would simple discharge producing a safe failure as opposed to a very high powered draw being made on the calculator which it could not handle.

The EPROM signal that appeared on lead 82 is also connected to shift registers 90 and 91 for latching in the data being transferred from the EPROMS 76, 77 and 78 and acting as a temporary storage means prior to the data being transferred back to the calculator. It is noted that the transfer from the EPROMS is in parallel form minimizing the time for completing the transfer.

The data transferred into the shift registers 90 and 91 remain there until the shift register clock (SOCLK) begins clocking the data out in serial form over lead 92 starting at clock pulse 46 and extending through pulse 55 as shown in the timing and control circuit of FIG. 2.

Note that the signal ISA out is fed back to the cable interface circuit shown in FIG. 3 along with the control signals causing the data and address to be transferred to the calculator. The address produced by the shift registers 66 and 67 of FIG. 5 are applied to the corresponding label lines shown in FIG. 6 for being fed into the EPROMS 76, 77 and 78 for identifying the particular program desired to be transferred out of the EPROMS.

The reason for the address selection is that the calculator has a 64K addressing range and the black box is capable of answering for anything from 4–16K.

While the circuit has been described with the use of EPROMS, it is to be understood that other chips such as PROMS and ROMS could be used.

While a preferred embodiment of the invention has been described using specific terms, such description is for illustrative purposes only, and it is to be understood that changes and variations may be made without departing from the spirit or scope of the following claims.

What is claimed is:

1. An apparatus for making available to a calculator remote programs on at least one memory chip and transferring data stored in said chip into said calculator using power only from a power supply of said calculator, comprising:
   connector means for connecting said calculator with said apparatus, and supplying a chain of clock pulses from said calculator therethrough to said apparatus;
   temporary storage means for receiving data from said chip and subsequently outputting the same;
   a capacitor connected by said connector means to said power supply for being charged thereby;
   means for operating said chip with power generated by discharging said charged capacitor for a predetermined interval of time between adjacent of said clock pulses to transfer said data stored in said chip to said temporary storage means;
   means for transferring said data from said temporary storage means to said calculator at a slower rate than that which said data was transferred into said temporary storage means from said chip; and
   means for cutting off power being generated by the discharging capacitor to said chip immediately after said data is transferred from said chip to said temporary storage means, thereby minimizing the power requirement for transferring data from said chip to said calculator.

2. The apparatus as set forth in claim 1 wherein said chip is an EPROM chip.

3. The apparatus as set forth in claim 1 wherein said means for operating said chip includes:
   (i) a first semiconductive device having a first electrode connected to said power supply of said calculator, a second trigger electrode, and an output electrode; and
   (ii) a second semiconductive device having an input electrode, a trigger electrode and an output electrode; and wherein
   said capacitor is connected between said output electrode of said first semiconductor device and said input electrode of said second semiconductor device; and said second semiconductor device connects said capacitor to said chip through said second semiconductive device; said apparatus further including
   means for supplying a trigger pulse to said first semiconductive device to cut off said first semiconductive device after said power supply charges said capacitor; and
   means for supplying a trigger pulse to said second semiconductor device to discharge said capacitor therethrough and thereby turn on said chip.

4. The apparatus as set forth in claim 3 wherein said first and second semiconductive devices are field effect transistors.

5. The apparatus as set forth in claim 1, wherein said temporary storage means includes:
   a shift register having parallel inputs and an output lead, with said parallel inputs connected to said chip for receiving said data from said chip in parallel form, and
   clock means, connected to said shift register for shifting said data from said shift register in serial form while power to said chip is cut off.

6. The apparatus as set forth in claim 1, wherein:
   said chain of clock pulses include a succession of $\phi 1$ pulses and a succession of $\phi 2$ pulses phase shifted from each other; and
   said predetermined interval of time for turn on of said chip is a fraction of the period between adjacent of said clock pulses.

7. An apparatus for supplying to a hand held calculator, having a D.C. power supply, remote programs provided on memory chips, comprising:
   a remote transportable housing;
   a socket mounted in said housing for receiving said chips having programs stored therein;
   connector means for connecting said calculator and said housing, and for supplying a chain of clock pulses from said calculator therethrough to said apparatus;
   temporary storage means, housed within said housing, for receiving and subsequently outputting said stored programs;
   a capacitor connected by said connector means to said power supply for being charged thereby;
   means, responsive to said chain of clock pulses, for temporarily supplying power generated by said charged capacitor to said chips for a predetermined period of time between adjacent of said clock pulses to thereby transfer in parallel form said programs stored in said chips to said temporary storage means;
   means for cutting off power to said chips immediately after said data is transferred therefrom to said temporary storage means; and
   means for transferring in serial form said data from said temporary storage means to said calculator.

* * * * *